(12) United States Patent
Branton et al.

(10) Patent No.: US 9,167,052 B2
(45) Date of Patent: Oct. 20, 2015

(54) APPARATUS, SYSTEMS, AND METHODS FOR PROVIDING POLICY IN NETWORK-BASED APPLICATIONS

(71) Applicant: AppSense Limited, Warrington (GB)

(72) Inventors: Paul Keith Branton, Rochdale (GB); Darren Robert Boyce, Cheshire (GB)

(73) Assignee: APPSENSE LIMITED, Warrington (GB)

( * ) Notice: Subject to any disclaimer, the term of this patent is extended or adjusted under 35 U.S.C. 154(b) by 238 days.

(21) Appl. No.: 13/969,208

(22) Filed: Aug. 16, 2013

(65) Prior Publication Data

US 2014/0337525 A1 Nov. 13, 2014

Related U.S. Application Data

(63) Continuation-in-part of application No. 13/892,678, filed on May 13, 2013.

(51) Int. Cl.
G06F 15/16 (2006.01)
H04L 29/08 (2006.01)
H04L 29/06 (2006.01)

(52) U.S. Cl.
CPC .............. H04L 67/34 (2013.01); H04L 63/102 (2013.01); H04L 67/02 (2013.01)

(58) Field of Classification Search
CPC .......... H04L 67/34; H04L 63/10; H04L 67/02
USPC ................................ 709/200–203, 217–227
See application file for complete search history.

(56) References Cited

U.S. PATENT DOCUMENTS

| | | | |
|---|---|---|---|
| 7,231,661 B1 | 6/2007 | Villavicencio et al. | |
| 7,296,235 B2 | 11/2007 | Bhat et al. | |
| 7,353,375 B2* | 4/2008 | Cepulis | 713/1 |
| 7,711,832 B1 | 5/2010 | Champion et al. | |
| 7,865,931 B1 | 1/2011 | Stone et al. | |
| 7,937,755 B1* | 5/2011 | Guruswamy | 726/22 |
| 2002/0065955 A1 | 5/2002 | Gvily | |
| 2003/0101235 A1 | 5/2003 | Zhang | |

(Continued)

FOREIGN PATENT DOCUMENTS

WO WO-02/31685 A1 4/2002
WO WO-2005/091107 A1 9/2005

(Continued)

OTHER PUBLICATIONS

United Kingdom Search Report issued by the United Kingdom Intellectual Property Office for Application No. GB1408468.5 mailed on Oct. 27, 2014 (4 pages).

(Continued)

*Primary Examiner* — Moustafa M Meky
(74) *Attorney, Agent, or Firm* — Wilmer Cutler Pickering Hale and Dorr LLP

(57) ABSTRACT

The disclosed subject matter provides apparatus, systems, and methods for preventing a user from disabling a software extension to a network-based application, thereby allowing a computing device to enforce the software extension even if the user wants to disable the software extension. The disclosed apparatus, systems, and methods can prevent a user from disabling a software extension by blocking an access to a communications network via the network-based application when the software extension is disabled.

20 Claims, 7 Drawing Sheets

(56) References Cited

U.S. PATENT DOCUMENTS

| | | | |
|---|---|---|---|
| 2004/0003043 A1 | 1/2004 | Rajamony et al. | |
| 2005/0021978 A1 | 1/2005 | Bhat et al. | |
| 2005/0229104 A1 | 10/2005 | Franco et al. | |
| 2006/0080523 A1* | 4/2006 | Cepulis | 713/100 |
| 2006/0130139 A1 | 6/2006 | Sobel et al. | |
| 2007/0198525 A1 | 8/2007 | Chatterjee et al. | |
| 2008/0172382 A1 | 7/2008 | Prettejohn | |
| 2008/0229288 A1* | 9/2008 | Nelson et al. | 717/127 |
| 2008/0307506 A1 | 12/2008 | Saldhana | |
| 2009/0241143 A1 | 9/2009 | White et al. | |
| 2010/0077444 A1 | 3/2010 | Forristal | |
| 2010/0313252 A1* | 12/2010 | Trouw | 726/7 |
| 2012/0159145 A1 | 6/2012 | Cheong et al. | |
| 2013/0145361 A1 | 6/2013 | Kaegi | |
| 2013/0167045 A1 | 6/2013 | Xu et al. | |
| 2013/0185362 A1* | 7/2013 | Clagg et al. | 709/206 |
| 2014/0207863 A1 | 7/2014 | Steinberg et al. | |

FOREIGN PATENT DOCUMENTS

| | | |
|---|---|---|
| WO | WO-2010/039505 A2 | 4/2010 |
| WO | WO-2013/109450 A1 | 7/2013 |

OTHER PUBLICATIONS

"AutoHotkey", (http://www.autohotkey.com), retrieved from the internet on May 5, 2014 (2 pages).

"Browser extension", http://en.wikipedia.org/w/index.php?title=browser_extension&printable=yes, printed on May 8, 2013, 3 pages.

"DesktopNow: Simply the management of any Windows desktop, physical or virtual, while increasing IT control and user productivity.", http://www.appsense.com/products/desktop/desktopnow/, printed on May 13, 2013, 2 pages.

"Encrypting File System", http://en.wikipedia.org/wiki/Encrypting_File_System, 8 pages.

"iOS App Programming Guide", http://developer.apple.com/library/ios/#DOCUMENTATION/iPhone/Conceptual/iPhoneOsProgrammingGuide/AdvancedAppTricks/AdvancedAppTricks.html#//apple_ref/doc/uid/TP40007072-CH7-SW11, 149 pages.

"Fingerprint (computing)", http://en.wikipedia.org/wiki/Fingerprint_%28computing%29, 4 pages.

"Citrix ShareFile", http://www.sharefile.com/, printed on Jul. 24, 2013, 2 pages.

"OpenText Managed File Transfer", http://connectivity.opentext.com/resource-centre/evaluations/opentext-managed-file-transfer.aspx, 1 page.

United Kingdom Search Report issued by the United Kingdom Intellectual Property Office for Application No. GB1408457.8 dated Nov. 25, 2014 (3 pages).

United Kingdom Search Report issued by the United Kingdom Intellectual Property Office for Application No. GB1408483.4 dated Dec. 3, 2014 (4 pages).

* cited by examiner

Status Table
Internet Explorer

| PID | SID Parental Ctrl Plugin | SID Enterprise Plugin |
|---|---|---|
| 0x8723 | 72 | 89 |
| 0x5213 | 99 | 32 |
| 0x8923 | 93 | |

APPARATUS, SYSTEMS, AND METHODS FOR PROVIDING POLICY IN NETWORK-BASED APPLICATIONS

CROSS-REFERENCE TO RELATED APPLICATION

This application is a continuation-in-part (CIP) application of a co-pending U.S. patent application Ser. No. 13/892,678, entitled "WEB EVENT FRAMEWORK," filed on May 13, 2013, which is expressly hereby incorporated by reference herein in its entirety.

TECHNICAL FIELD

Disclosed apparatus, systems, and methods relate to providing policy control in network-based applications.

BACKGROUND

Computer systems can provide user environment management and/or policy control for computing devices (e.g., Windows-based PCs). A system policy can be defined within an enterprise computer network either: to respond to system events such as computer startup/shutdown, user login/logoff, process start/stop, and session changes, etc.; or to prevent or control user behavior in applications and the desktop environment. For example, a pre-defined script can run when a user logs in to a corporate network; a particular group of users can be prevented from using parts of an application.

SUMMARY

In accordance with the disclosed subject matter, apparatus, systems, and methods are provided for providing policy in network-based applications.

Disclosed embodiments include an apparatus. The apparatus can include one or more interfaces configured to provide communication with a computing device via a communication network. The apparatus can also include non-transitory memory configured to maintain computer readable instructions and a status table, wherein the status table includes information indicative of a status of a software extension associated with a network-based application instantiated on the computing device. The apparatus can also include a processor in communication with the memory, wherein the computer readable instructions are configured to cause the processor to determine, based on the information in the status table, the status of the software extension associated with the network-based application, wherein the status of the software extension is indicative of whether the software extension is enabled or disabled; and when the software extension is disabled, send a network stop message to the computing device to cause a network access of the network-based application to be disabled.

Disclosed embodiments include a method. The method can include establishing a communication channel between a server and a computing device over a communication network, maintaining, at the server, a status table that includes information indicative of a status of a software extension associated with a network-based application instantiated on the computing device, and determining, at the server, based on the information in the status table, the status of the software extension associated with the network-based application, wherein the status of the software extension is indicative of whether the software extension is enabled or disabled. If the software extension is disabled, the method can include sending, by the server, a network stop message to the computing device to cause a network access of the network-based application to be disabled.

Disclosed embodiments include a non-transitory computer readable medium. The non-transitory computer readable medium can include executable instructions operable to cause a server to establish a communication channel between the server and a computing device over a communication network, maintain a status table that includes information indicative of a status of a software extension associated with a network-based application instantiated on the computing device, and determine based on the information in the status table, the status of the software extension associated with the instance of the network-based application, wherein the status of the software extension is indicative of whether the software extension is enabled or disabled. If the software extension is disabled, the executable instructions can be further operable to cause the server to send a network stop message to the computing device to cause a network access of the instance of the network-based application to be disabled.

In some embodiments, the status table can include a first array and a second array, wherein the first array includes at least one process identifier of instances of the network-based application, and the second array includes at least one socket identifier of instances of the software extension, wherein each socket identifier identifies a communication connection between an instance of the software extension and the server.

In some embodiments, the apparatus, the method, or the non-tangible computer readable medium can include computer readable instructions, steps, or executable instructions operable to cause the processor or the server to compare lengths of the first array and the second array, and if the length of the first array is different from the length of the second array, to cause the processor or the server to determine that the software extension is disabled.

In some embodiments, the apparatus, the method, or the non-tangible computer readable medium can include computer readable instructions, steps, or executable instructions operable to cause the processor or the server to receive a process start message from a first instance of the network-based application, wherein the process start message includes a first process identifier of the first instance of the network-based application, store the first process identifier in the first array of the status table, receive a startup event message from a first instance of the software extension, wherein the startup event message includes a first socket identifier of the first instance of the software extension, and store the first socket identifier in the second array of the status table.

In some embodiments, the network stop message includes a process identifier of an instance of the network-based application whose network access is to be disabled.

In some embodiments, the apparatus, the method, or the non-tangible computer readable medium can include computer readable instructions, steps, or executable instructions operable to cause the processor or the server to cause the processor or the server to retrieve, from the status table, the process identifier of the instance of the network-based application whose network access is to be disabled.

In some embodiments, the server can include a plurality of status tables, and the process start message includes an application identifier of the network-based application. Also, the apparatus, the method, or the non-tangible computer readable medium can include computer readable instructions, steps, or executable instructions operable to cause the processor or the server to identify the status table for the process start message based on the application identifier.

In some embodiments, the apparatus, the method, or the non-tangible computer readable medium can include computer readable instructions, steps, or executable instructions operable to cause the processor or the server to determine the status of the software extension in response to an external event, wherein the external event includes one of: a receipt of a startup event message from the software extension; a receipt of a termination message from the software extension; a receipt of a process start message from the network-based application; and a receipt of a process stop message from the network-based application.

In some embodiments, the apparatus, the method, or the non-tangible computer readable medium can include computer readable instructions, steps, or executable instructions operable to cause the processor or the server to cause a message to be sent to a user of the computing device that the software extension is disabled.

These and other capabilities of embodiments will be more fully understood after a review of the following figures, detailed description, and claims.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

FIG. 6 illustrates a multi-status table for tracking the status of more than one software extension in accordance with some embodiments.

DETAILED DESCRIPTION

Figure 1:
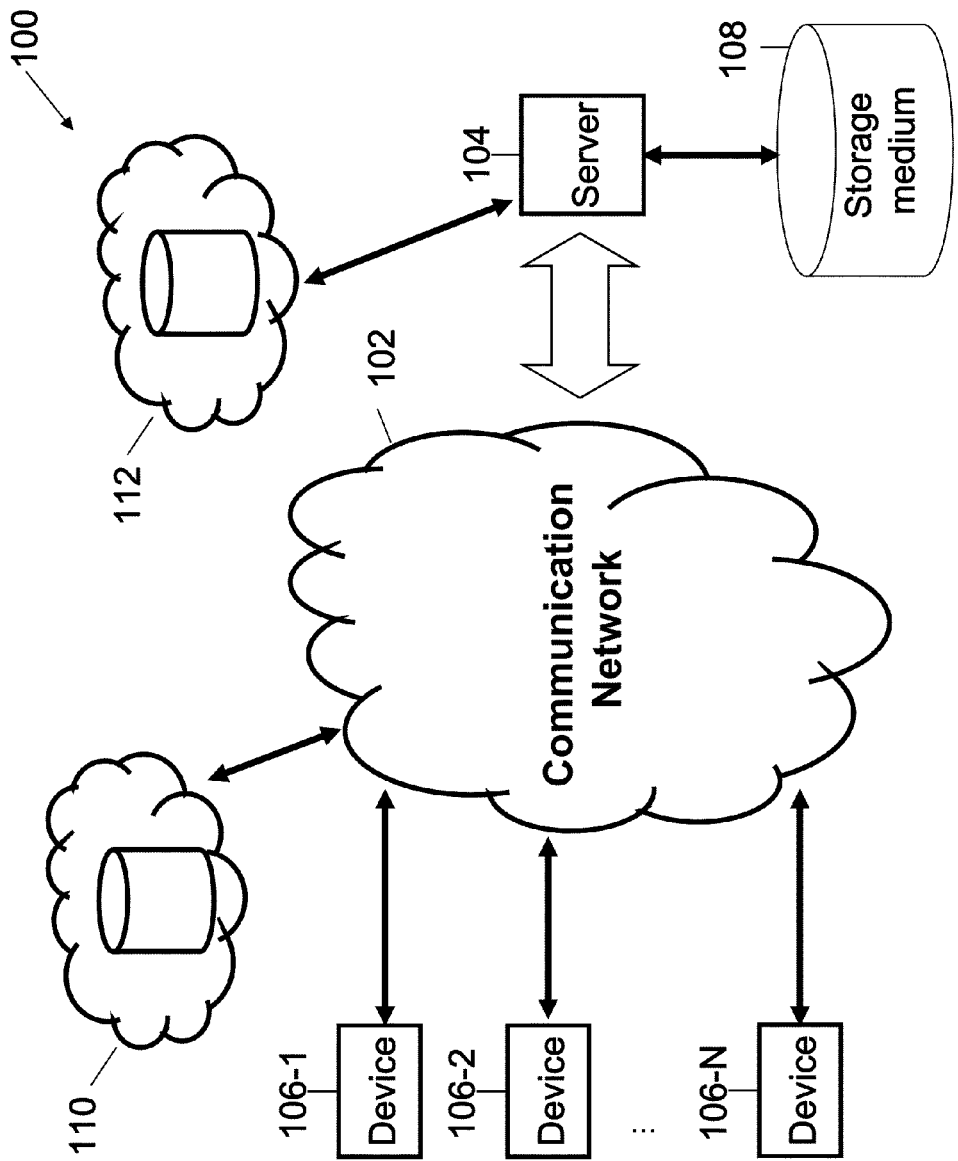
FIG. 1 illustrates an exemplary networked computing environment in accordance with some embodiments.

In the following description, numerous specific details are set forth regarding the apparatus, systems, and methods, and the environment in which such apparatus, systems, and methods may operate, in order to provide a thorough understanding. It will be apparent to one skilled in the art, however, that the disclosed subject matter may be practiced without such specific details, and that certain features, which are well known in the art, are not described in detail in order to avoid complication. In addition, it will be understood that the embodiments described below are only examples, and that it is contemplated that there are other systems and methods that are within the scope.

A computing system can improve a user experience of a network-based application (NB-application) by augmenting the NB-application with certain policies. For example, the computing system can configure an NB-application, for instance a web browser including one of Google Chrome, Microsoft Internet Explorer, Mozilla Firefox, Safari, and Opera, to respond to certain web events, such as a loading of a webpage, a selection of a uniform resource locator (URL), or an addition or deletion of a tab in the web browser. The computing system can also configure an NB-application to implement web policies, such as blocking and redirecting URLs, or preventing use of particular buttons or menus in a web page. This way, the computing system can supplement and/or control the functionality of the NB-application and the associated user experience.

In some cases, the computing system can implement policies using a software extension to the NB-application, such as a plugin. The software extension can include software instructions that can detect and respond to web events and implement web policies. In some cases, the software extension can be invoked when the associated NB-application is initiated. This way, whenever the NB-application is in operation, the software extension can be triggered to monitor activities associated with the NB-application, and respond to the activities in accordance with the policies.

Unfortunately, a software extension can be easily disabled by a user. For example, a user can indicate, usually with a couple of button clicks, that the user wants to disable the software extension. In response, the NB-application would disable the software extension, even if an administrator of the computing device wants to enforce policies associated with the software extension. This can be problematic for many software extensions because this limits the effectiveness of software extensions. For instance, a child can easily disable a parental control plugin of a web browser and gain access to explicit content, thereby limiting the effectiveness of the parental control plugin.

Some computing devices attempt to address this issue by sending a notification to a system administrator when a software extension is disabled. This way, the system administrator is aware that a user of the computing system has turned off the software extension and can subsequently request the user not to turn off the software extension in the future. However, this mechanism cannot prevent a user from disabling the software extension.

The disclosed subject matter provides apparatus, systems, and methods for preventing a user from disabling a software extension to an NB-application, thereby allowing a computing device to enforce the software extension even if the user wants to disable the software extension. The disclosed embodiments can prevent a user from disabling a software extension by blocking an access to a communications network via the NB-application when the software extension is disabled. For example, when a user disables a parental control plugin of a web browser on a computing device, the computing device can block the web browser's access to the communication network and require the user to re-enable the parental control plugin if the user wants to access the communication network again via the web browser. Since the usefulness of a web browser is predicated on its access to the communication network, the user is, in effect, required to re-enable the parental control plugin and is discouraged from disabling the parental control plugin in the future. Therefore, this mechanism can prevent the user from disabling the parental control plugin.

The disclosed embodiments can use a status control module to detect a disabled status of a software extension and to cause a network access of an NB-application to be blocked or disabled. For example, once an NB-application is initiated, the status control module can determine whether a software extension associated with the NB-application is enabled or disabled. If the status control module determines that the software extension is disabled, the status control module can request a process module to block the application's network access. In response, the process module can block the application's network access by, for example, sending a network stop message to the NB-application. Therefore, when the status control module determines that the software extension is disabled, the status control module can cause the network access of the NB-application to be disabled.

In some embodiments, the status control module can reside in a server that is in communication with a computing device running the NB-application and/or the software extension. The status control module can communicate with a status table that allows the status control module to determine the status of the software extension. A status table can include a first column and a second column (or a first array and a second array). The first column can indicate a process identifier (ID) of instances of the NB-application and the second column can indicate a socket identifier (ID) of instances of a software extension for the NB-application. In some cases, the status control module can maintain separate status tables for each NB-application (e.g., Google Chrome, Microsoft Internet Explorer, Mozilla Firefox, Safari, Opera).

In some embodiments, the status table can be updated based on information received from the NB-application and/or the software extension. When an NB-application is instantiated (i.e., a process corresponding to an instance of the NB-application is initiated), the NB-application can send a process start message to the server. The process start message can include a process ID of the process corresponding to the instance of the NB-application. Subsequently, the server can add the process ID to the first column of the status table associated with the NB-application. Similarly, when a software extension is instantiated (i.e., a process corresponding to an instance of the software extension is initiated), the software extension can send a startup event message to the server. The startup event message can include a socket ID of the software extension instance. The socket ID can be a unique name (e.g., a unique number) that identifies a communication connection between the software extension instance and the server. Once the server receives the startup event message, the server can subsequently add the socket ID to the second column of the status table.

In some embodiments, the status control module can determine the status of a software extension by comparing a length of the first array and a length of the second array in the status table. The length of the first array indicates a number of operating instances of an NB-application; the length of the second array indicates a number of operating instances of a software extension. Therefore, when the second array of the status table has the same length as the first array, it means that there is a same number of operating instances of an NB-application and a software extension. Thus, when the second array of the status table has the same length as the first array, then the status control module can determine that none of the software extensions associated with the NB-application is disabled. However, if the second array of the status table is shorter than the first array, then the status control module can determine that at least one of the software extensions associated with the NB-application is disabled and subsequently cause the process module to block the NB-application's network access.

In some embodiments, an NB-application can be configured to run more than one software extension. In this case, the status table can include (N+1) arrays, the first array indicating a process ID of running instances of the NB-application, and the remaining N arrays each indicating a socket ID of running instances of distinct software extensions.

The disclosed embodiments can be implemented in a networked computing environment. FIG. 1 illustrates an exemplary networked computing environment 100 in accordance with some embodiments. The networked computing environment 100 can include a server 104, at least one computing device 106 (e.g., computing device 106-1, 106-2, ... 106-N), a physical storage medium 108, and cloud storage 110 and 112, which can all be coupled directly or indirectly to a communication network 102.

Each computing device 106 can communicate with the server 104 to send data to, and receive data from, the server 104 across the communication network 102. Each computing device 106 can be directly coupled to the server 104. Additionally, each computing device 106 can be connected to server 104 via any other suitable device, communication network, or combination thereof. For example, each computing device 106 can be coupled to the server 104 via one or more routers, switches, access points, and/or communication network (as described below in connection with communication network 102). A computing device 106 can include, for example, a desktop computer, a mobile computer, a tablet computer, a cellular device, a smartphone, or any computing systems that are capable of performing computation.

Server 104 can be coupled to at least one physical storage medium 108, which can be configured to store data for the server 104. Preferably, any computing device 106 can store data in, and access data from, the physical storage medium 108 via the server 104. FIG. 1 shows the server 104 and the physical storage medium 108 as separate components; however, the server 104 and physical storage medium 108 can be combined together. FIG. 1 also shows the server 104 as a single server; however, server 104 can include more than one server. FIG. 1 shows the physical storage medium 108 as a single physical storage medium; however, physical storage medium 108 can include more than one physical storage medium. The physical storage medium 108 can be located in the same physical location as the server 104, at a remote location, or any other suitable location or combination of locations.

FIG. 1 shows two embodiments of a cloud storage 110 and 112. Cloud storage 110 and/or 112 can store data from physical storage medium 108 with the same restrictions, security measures, authentication measures, policies, and other features associated with the physical storage medium 108. While FIG. 1 shows the cloud storage 112 separate from the communication network 102, cloud storage 112 can also be part of communication network 102 or another communication network. The server 104 can use only cloud storage 110, only cloud storage 112, or both cloud storages 110 and 112. While FIG. 1 shows one cloud storage 110 and one cloud storage 112, more than one cloud storage 110 and/or more than one cloud storage 112 or any suitable combination thereof can be used.

The communication network 102 can include the Internet, a cellular network, a telephone network, a computer network, a packet switching network, a line switching network, a local area network (LAN), a wide area network (WAN), a global area network, or any number of private networks currently referred to as an Intranet, and/or any other network or combination of networks that can accommodate data communication. Such networks may be implemented with any number of hardware and software components, transmission media and network protocols. While FIG. 1 shows the network 102 as a single network, the network 102 can also include multiple interconnected networks listed above.

Figure 2:
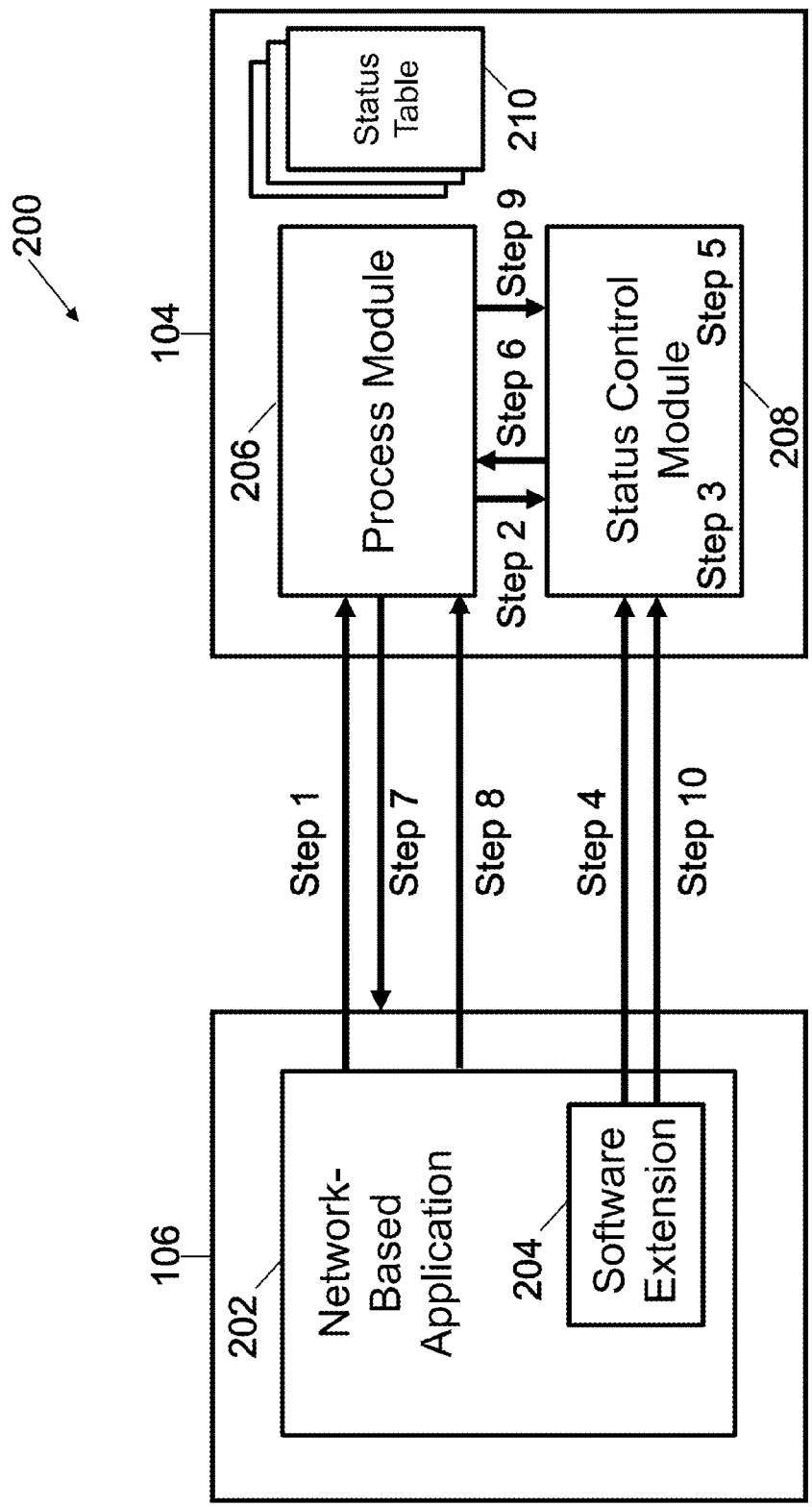
FIG. 2 illustrates a software extension status control system in accordance with some embodiments.

FIG. 2 illustrates a software extension status control system 200 in accordance with some embodiments. The software extension status control system 200 can include a computing device 106 configured to operate a network-based application (NB-application) 202 and a software extension 204 associated with the NB-application 202. System 200 can also include a server 104 configured to operate a process module 206 and a status control module 208. Although the process module 206 and the status control module 208 are depicted as separate modules, the process module 206 and the status control module 208 can be a part of a single module in the server 104 in some embodiments.

The NB-application 202 can include an application that is configured to communicate with a communication network 102 for its operation. The NB-application 202 can include a web browser, such as Google Chrome, Internet Explorer, Firefox, Safari, and Opera. The NB-application 202 can include other types of applications that connect to a server to provide functionalities to users. In some cases, the NB-application 202 can include multiple application instances. Each instance of the NB-application 202 can be associated with a distinct process and can be associated with a distinct process ID assigned by an operating system. For example, a computing device can operate two separate windows of Internet Explore; each window of Internet Explorer can be associated with a separate process and a separate process ID.

The NB-application 202 can be associated with one or more software extensions 204. When multiple software extensions 204 are associated with one NB-application 202, functionalities can be split among the multiple software extensions 204. In one example, the software extension 204 can be embedded within the NB-application 202; in another example, only a portion of the software extension 204 is embedded within NB-application 202 and the rest can be outside but coupled to the NB-application 202.

The software extension 204 can be configured to respond to certain web events or to implement certain web policies. The software extension 204 can include, for example, a plugin that operates in conjunction with a web browser. The software extension 204 can also include a software patch that operates in conjunction with an NB-application. The software extension 204 can also include a framework plugin as described in a co-pending U.S. patent application Ser. No. 13/892,678, entitled "WEB EVENT FRAMEWORK," filed on May 13, 2013, which is expressly hereby incorporated by reference herein in its entirety. The operation of the software extension 204 can be configured using operation configuration. The operation configuration can define whether and how to handle a particular event, and what, if any, action should be generated in response to a particular event with certain parameter(s). The operation configuration can be defined in a JavaScript Object Notation (JSON) format.

In some embodiments, a software extension 204 can be enabled or disabled based on status configuration. If the status configuration indicates that the software extension 204 is enabled, the software extension 204 can operate in conjunction with the NB-application 202. In some cases, if the status configuration indicates that the software extension 204 is enabled, the software extension 204 can be configured to start automatically once the associated NB-application 202 is instantiated. In some cases, the status configuration can be stored in memory coupled to the computing device 106; in some cases, the status configuration can be stored in a register of a processor in the computing device 106. In some cases, the default setting of the status configuration is "enabled."

In some embodiments, the status configuration of a software extension 204 can be modified by a user. For example, the computing device 106 can request a user to specify the status configuration using, for instance, a pop-up window, and in response to the request, the user can specify whether the software extension 204 is "enabled" or "disabled," for instance, by selecting an appropriate button on the pop-up window. Once the user specifies the status configuration, the computing device 106 can operate the software extension 204 based on the status configuration.

In some embodiments, a software extension 204 can include multiple instances. If the software extension 204 is properly enabled, the number of instances of the software extension 204 can be the same as the number of instances of the NB-application 202. In some cases, an instance of a software extension 204 can communicate with an external computing device, such as a server 104, via a socket. A socket can include an endpoint of an inter-process communication flow across a communication network, and can be identified using a socket ID. Therefore, each instance of a software extension 204 can be associated with a socket ID of the socket through which it communicates with an external computing device, such as a server 104. In some embodiments, each instance of the software extension 204 can use a separate socket ID. In other embodiments, two or more instances of the software extension 204 can share one or more socket IDs.

The NB-application 202 and/or the software extension 204 can be monitored by the server 104 over a communication network 102. In some embodiments, the server 104 can include a process module 206 that is configured to receive messages from the NB-application 202. For example, the process module 206 can include an HTTP server module that can listen for HTTP messages (e.g., HTTP POST messages) from the NB-application 202. In some embodiments, the server 104 can include an status control module 208 that is configured to detect connections from one or more software extensions 204. For example, the status control module 208 can include a socket server that detects connections from the one or more software extensions 204.

Figure 3:
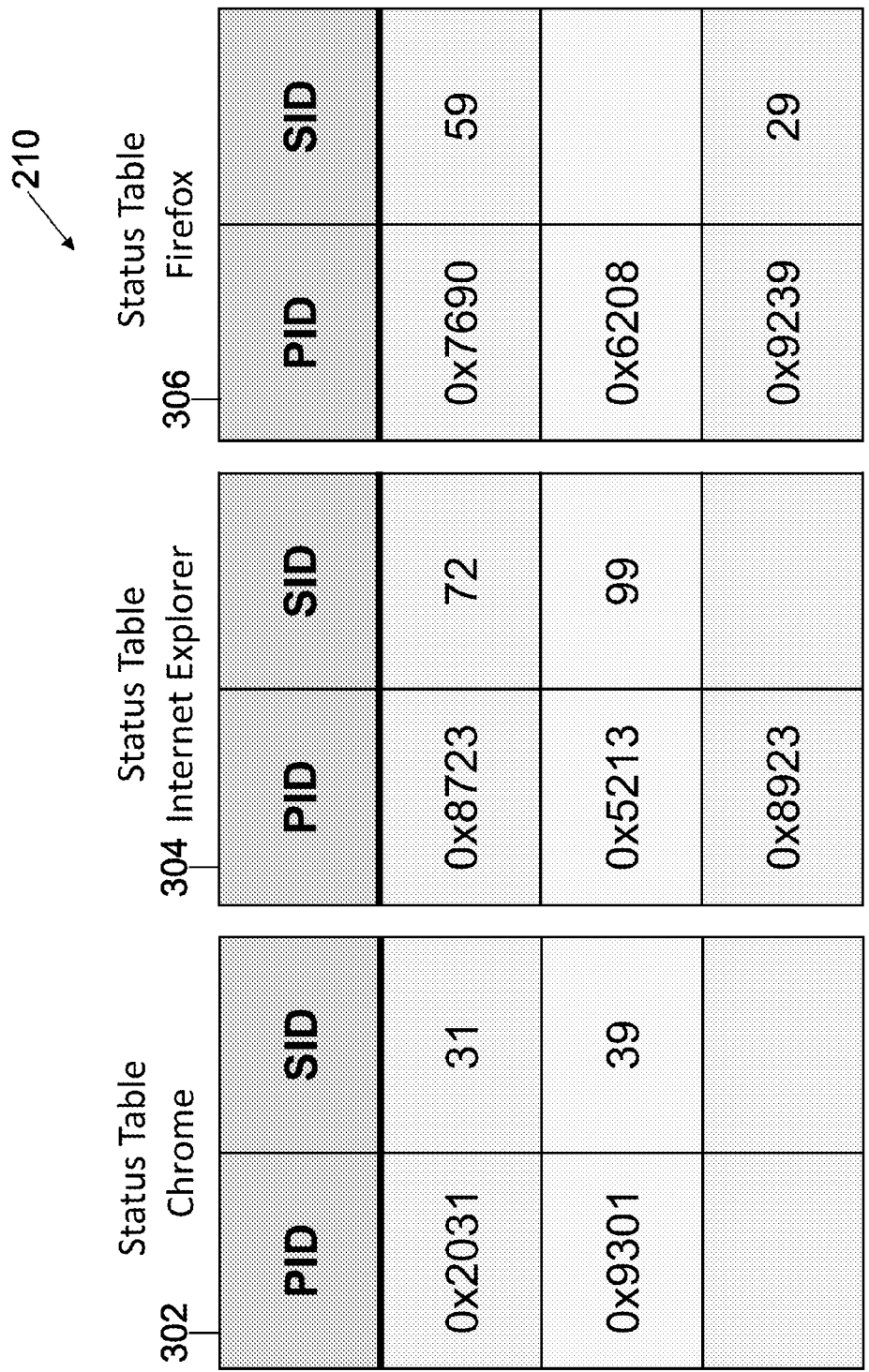
FIG. 3 illustrates one or more status tables maintained by the server in accordance with some embodiments.

In some embodiments, the server 104 can maintain one or more status tables 210. A status table 210 can maintain information indicative of a status of a software extension 204, associated with an instance of an NB application 202, running on a computing device 106. In some cases, the server 104 can maintain a separate status table 210 for each NB-application 202. FIG. 3 illustrates one or more status tables maintained by the server in accordance with some embodiments. In this illustration, the server 104 maintains three status tables, a first status table 302 for Chrome, a second status table 304 for Internet Explorer, and a third status table 306 for Firefox. Each status table can include at least two columns (or at least two arrays), a first column indicating the process ID (PID) of instances of the NB-application 202, and the remaining column(s) indicating the socket ID (SID) of instances of software extensions 204. In some cases, the one or more status tables can be updated by the status control module 208.

In some embodiments, a column in the status table 210 can be independent of other columns in the status table. For example, each column in the status table 210 can be filled up from the top to bottom without maintaining any correspondence across elements in the same row. In this configuration, columns in the status table are used essentially as a set of independent arrays. This configuration is useful when the startup event message from the software extension 204 does not provide a process ID of the NB-application instance running the software extension 204.

In other embodiments, a column in the status table 210 can be related to other columns in the status table. In particular, the status table 210 can maintain a mapping or a relationship between elements in the same row. For example, a process ID and a socket ID in the same row can be associated with the same instance of the NB application 202. The status table 306 shows this configuration: the status table 306 indicates that the NB-application instance having the process ID 0x7690 is running a software extension with the socket ID 59, whereas the NB-application instance having the process ID 0x6208 is not running a software extension. Such a mapping between the process ID of the NB-application instance and the software extension 204 can allow the server 104 to disable a network access of a particular instance of the NB-application 202 for which the software extension 204 is disabled, as discussed further below. The status table 210 having this configuration can be updated based on a startup event message, from the software extension 204, that provides a process ID of the NB-application instance associated with the software extension 204.

In some embodiments, the software extension status control system 200 can use the status control module 208 and the status table 210 to determine a status of the software extension 204, for example, whether the software extension 204 is enabled or disabled. Depending on the status of the software extension 204, the software extension status control system 200 can cause the network access of the NB-application 202 to be blocked or the NB-application 202 to be terminated.

Figure 4:
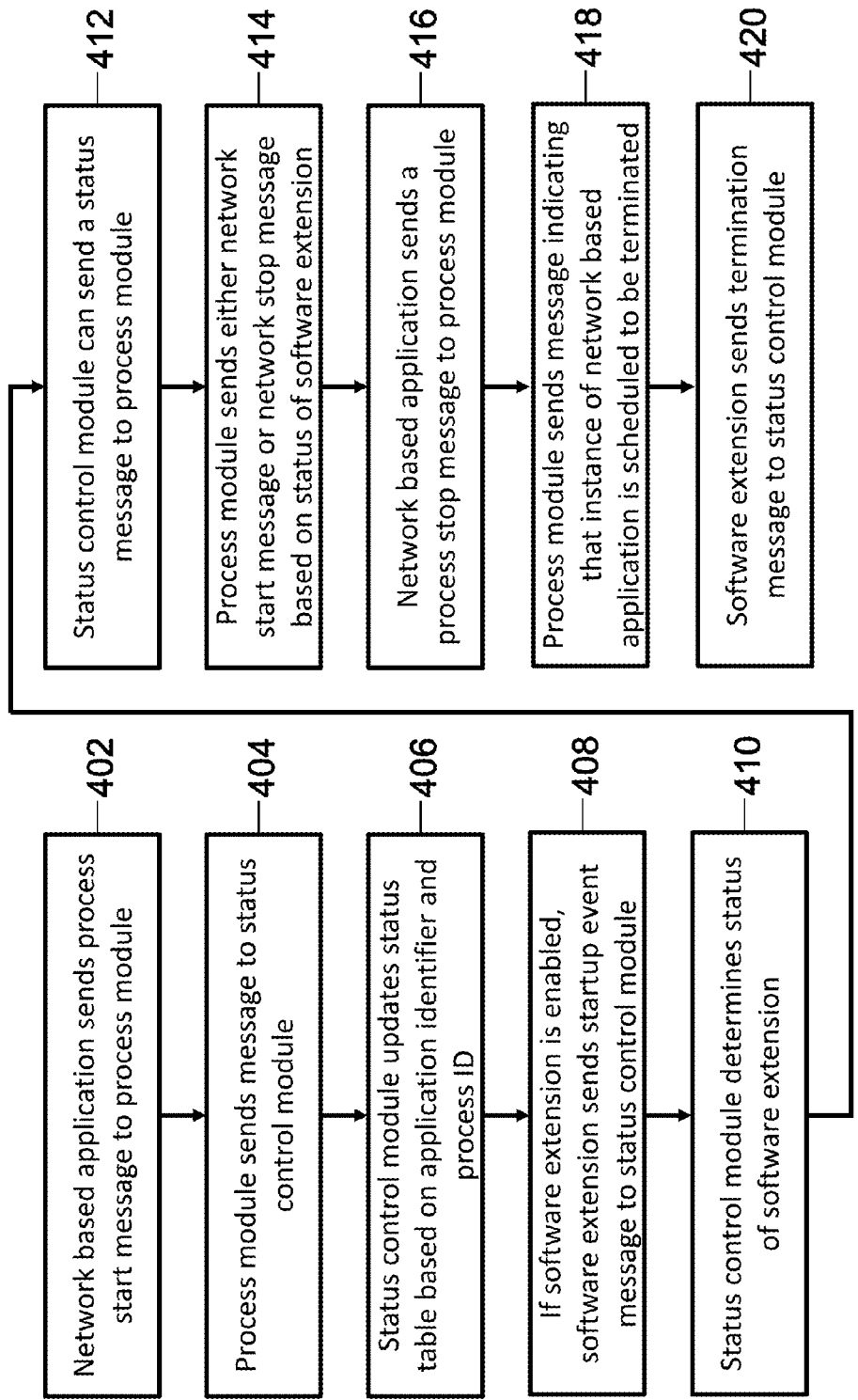
FIG. 4 illustrates a process of a software extension status control system in accordance with some embodiments.

FIG. 4 illustrates a process of the software extension status control system in accordance with some embodiments. Each step in FIG. 4 can correspond to one of the steps illustrated in FIG. 2.

In step 402, when the NB-application 202 is instantiated (i.e., an instance of the NB-application is initiated), the instance of the NB-application 202 can send a process start message to the process module 206, as illustrated as step 1 of FIG. 2. The process start message can include an application identifier and a process ID of the instance of the NB-application 202. The application identifier can include a process specific name. For example, the application identifier can include a name of a process, such as "iexplorer.exe" that is mapped into a common name, such as Internet Explorer. In step 404, the process module 206 can send a message to the status control module 208, as illustrated as step 2 of FIG. 2, where the message includes the application identifier and the process ID. In some cases, the process module 206 can operate in a proxy mode and forward the process start message to the status control module 208.

In step 406, the status control module 208 can update a status table in the server 104 based on the application identifier and the process ID in the message from the process module 206, as illustrated as step 3 of FIG. 2. If the server 104 maintains a separate status table for separate NB applications, the server 104 can update the status table 210 corresponding to the NB application. The status table 210 corresponding to the NB application 202 can be identified by the application identifier. For example, the server 104, such as a status control module 208 in the server 104, can determine a name of an application based on the application identifier. Then the status control module 208 can identify a status table associated with the determined application name, and add the received process ID to the first column of the identified status table.

In some embodiments, the server 104 can convert the application identifier into the name of the application using a look-up table. If the application identifier received from the process module 206 does not have a matching application name in the look-up table, then the status control module 208 can ignore the message from the process module 206 in step 2 and abort a subsequent update of the status table 210.

In step 408, if the software extension 204 is enabled, the software extension 204 is configured to send a startup event message, via an assigned socket, to the status control module 208, as illustrated as step 4 of FIG. 2. Therefore, once the status control module 208 receives a process start message from an instance of an NB-application 202, the status control module 208 is configured to wait for a predetermined period of time to receive a message from the software extension 204 so that the software extension 204 has enough time to send the message. The predetermined period of time can be determined based on an amount of time it takes to initiate the software extension 204 at the computing device 106. In some cases, the predetermined period of time can be less than 1 second, 0.5 second, 0.25 second, 0.1 second, or any other suitable time period. The predetermined period of time allows the software extension 204 to signal any changes to the status control module 208.

In some embodiments, the startup event message can include an application identifier of the NB application 202 and a socket ID of a socket via which the software extension is communicating with the status control module 208. Subsequent to receiving the startup event message, the status control module 208 can update the status table 210 in the server 104 based on the application identifier and the socket ID. If the server 104 maintains a separate status table for separate NB applications, the server 104 can update the status table 210 corresponding to the NB application identified by the application identifier. For example, the server 104, such as the status control module 208 in the server 104, can determine a name of an application based on the application identifier. Then the status control module 208 can identify a status table associated with the determined application name, and add the received socket ID to the second column of the identified status table.

In some embodiments, the startup event message can include, in addition to the application identifier and the socket ID, a process ID of an NB-application instance for which the software extension is enabled. In this case, the status table 210 can be configured to maintain a mapping between the socket ID and the process ID of the application instance, as in the status table 306 of FIG. 3. This feature can be useful for disabling a network access of only one of the application instances of an NB-application, as discussed below.

If the software extension 204 is disabled, the software extension 204 does not send the startup event message to the status control module 208 and the waiting period for the status control module 208 expires after the predetermined period of time. Therefore, if the software extension 204 is disabled, the status control module 208 does not update the status update table.

In step 410, the status control module 208 can determine a status of the software extension 204 of the NB application 202, as illustrated as step 5 of FIG. 2. In particular, the status control module 208 can determine whether the software extension 204 of the NB application 202 is enabled or disabled. In some embodiments, the status control module 208 can determine the status of the software extension 204 using the status table 210.

In step 412, upon determining the status of the software extension 204, the status control module 208 can send a status message to the process module 204, as illustrated as step 6 of FIG. 2. The status message can indicate whether the software extension 204 is enabled or disabled.

In step 414, the process module 206 can send either a network start message or a network stop message to the computing device 106 based on the status of the software extension 204 indicated in the status message, as illustrated as step 7 of FIG. 2. If the software extension 204 is disabled, the process module 206 can send a network stop message to the computing device 106; if the software extension 204 is enabled, the process module 206 can send a network start message to the computing device 106. The network start message or the network stop message can include an application identifier that identifies the NB-application 202.

When the computing device 106 receives a network stop message, the computing device 106 can identify the NB-application 202 based on the application identifier in the network stop message, and subsequently block (or disable) the network access of the identified NB-application 202. Also, the computing device 106 can store a disabled network access status of the NB-application 202 in status configuration associated with the identified NB-application 202. In some embodiments, the computing device 106 can disable network access of all application instances of the NB-application 202. In other embodiments, the computing device 106 can block network access of the NB-application instance whose software extension 204 is disabled. For example, the network stop message can include, in addition to the application identifier, a process ID of the application instance whose software extension is disabled. In this case, the computing device 106 can identify the NB-application instance associated with the process ID, and disable network access of only the identified application instance of the NB-application 202. The process ID of the NB-application instance with a disabled software extension 204 can be provided in the network stop message by the process module 206 or the status control module 208. The process module 206 or the status control module 208 can derive this information based on the status table. As discussed with respect to the status table 306 of FIG. 3, the status table 306 can maintain a mapping between a process ID and a socket ID of a software extension. Therefore, the process module 206 or the status control module 208 can search the status table 306 to determine the process ID that is not associated with any socket ID, and send a network stop message having the determined process ID to the computing device 106. This way, the process module 206 or the status control module 208 can disable network access of the NB-application instance associated with that identified process ID.

In some embodiments, the computing device 106 can be configured to enable or disable network access of the NB-application 202 using an application programming interface (API) hooking mechanism. The API hooking mechanism involves injecting a dynamic-link library (DLL) hook file to the NB-application 202 so that the DLL hook can monitor and control network access of the NB-application 202.

The DLL hook can be configured to monitor and control network access of the NB-application 202 by monitoring requests to Windows Sockets API (Winsock) APIs. For example, when an NB-application 202 requests network access using a winsock API, this request can be intercepted by the DLL hook. Subsequently, the DLL hook can determine whether the network access of the NB-application 202 is enabled or disabled. In some cases, the DLL hook file can determine whether the network access is enabled or disabled using the status configuration in the computing device 106, as discussed above. In other cases, the DLL hook can determine whether the network access is enabled or disabled by sending a status request to the server 104. If the DLL hook receives a negative response to the status request, indicating that the network access of the NB-application 202 is disabled, the DLL hook can drop the winsock API call from the NB-application 202 and return an appropriate error message to the NB-application 202, indicating that the winsock API call has failed. This way, the network access of the NB-application 202 can be disabled, even though the winsock API may not be mal-functioning. If the DLL hook receives a positive response to the status request, indicating that the network access of the NB-application 202 is enabled, the DLL hook can forward the winsock API request to an appropriate module in the computing device 106 so that the NB-application 202 can access the network using the winsock API.

In some embodiments, the computing device 106 can optionally display a message to the user, indicating that the NB-application 202 does not have a network access because the software extension 204 for the NB-application 202 has been disabled. This way, the user is notified to re-enable the software extension 204 to use the NB-application 202.

When the computing device 106 receives a network start message, the computing device 106 can identify the NB-application 202 based on the application identifier in the network start message, and enable the network access of the identified NB-application 202. Also, the computing device 106 can store an enabled network access status of the NB-application 202 in status configuration associated with the identified NB-application 202. In some embodiments, the computing device 106 can enable network access of all application instances of the NB-application 202. In other embodiments, the computing device 106 can enable network access of the application instance whose software extension 204 is enabled. For example, the network start message can include, in addition to the application identifier, a process ID of the application instance whose software extension is enabled. In this case, the computing device 106 can identify the NB-application instance associated with the process ID, and block network access of only the identified application instance of the NB-application 202. The mechanism for enabling network access of only the identified application instance of the NB-application 202 is similar to the mechanism for disabling network access of only the identified application instance of the NB-application 202.

In some embodiments, the computing device 206 can re-enable network access of the NB-application 202 when a user enables a disabled software extension 204 associated with the NB-application 202. To enable this feature, once the computing device 106 receives a network stop message from the server 104, the computing device 206 can block network access (e.g., Internet access) of the NB-application 202, but provide a communication channel between the NB-application 202, the software extension 204, and the server 104.

In some cases, the computing device 106 can provide the communication channel by providing the NB-application 202 and/or the software extension 204 with a local network communication in a local communication network, such as a LAN. For example, although the computing device 106 disables non-local network access of the NB-application 202 and the software extension 204, the computing device 106 can enable the NB-application 202 or the software extension 204 to communicate with the server 104 if the server 104 resides in the LAN.

In other cases, the computing device 106 can provide the communication channel by providing communication with a particular network address and/or a port number. For example, although the computing device 106 disables network access of the NB-application 202 and the software extension 204, the computing device 106 can allow the NB-application 202 or the software extension 204 to communicate with another computing device having a particular IP address and/or a port number, for instance, localhost:12345 or myserver.com:54321.

Once the software extension 204 is re-enabled, the software extension 204 can send a startup event message to the status control module via the communication channel, indicating that the software extension 204 has been re-enabled. Subsequently, the software extension status control system can go to step 410 and re-evaluate whether the software extension 204 is properly enabled. If the software extension 204 is properly enabled, the software extension status control system can enable non-local network access of the NB-application 202, as discussed in steps 410-414.

Alternatively, in step 414 of FIG. 4, illustrated in FIG. 2 as step 7, if the software extension 204 is disabled, the process module 206 can cause the NB-application 202 to terminate. For example, the process module 206 can send an application termination message to the computing device 106. The application termination message can include an application identifier, indicating that processes of the NB-application 202 should be terminated. In response to receiving the application termination message, the computing device 106 can terminate the processes of the NB-application 202 as identified by the application identifier.

In step 416, when an instance of an NB-application 202 is scheduled to be terminated, the instance of the NB-application 202 can send a process stop message to the process module 206, as illustrated as step 8 of FIG. 2. The process stop message can include an application identifier and a process ID associated with the instance of the NB-application 202. Subsequently, in step 418, the process module 206 can send the application identifier and the process ID to the status control module 208, as illustrated as step 9 of FIG. 2, indicating that the instance of the NB-application 202 is scheduled to be terminated. In response to the message from the process module 206, the status control module 208 can identify a status table 210 associated with the received application identifier, and remove the received process ID from the first column of the identified status table 210.

Likewise, in step 420, when an instance of a software extension 204 is scheduled to be terminated, the instance of the software extension 204 can send a termination message to the status control module 208, as illustrated as step 10 of FIG. 2. In some cases, the termination message can include an application identifier and a socket ID associated with the instance of the software extension 204. Subsequent to receiving the termination message, the status control module 208 can identify a status table associated with the received application identifier, and remove the received socket ID from the second column of the identified status table. In other cases, the termination message can include only the socket ID associated with the instance of the software extension 204. In this case, since the status control module 208 does not know which status table maintains the received socket ID, the status control module 208 can search all status tables associated with the computing device 106 to find the received socket ID. Once the status control module 208 finds the received socket ID from one of the status tables, the status control module 208 can remove the received socket ID from the identified status table.

In some embodiments, some of the steps illustrated in FIGS. 2 and 4 can be performed out-of-order. For example, the software extension 204 can send the startup event message before the status control module 208 updates the status table 210 associated with the NB-application 202. Also, the status control module 208 can add the socket ID of the software extension 204 to the status table 210 before the status control module 208 adds the process ID of the NB-application 202 to the status table 210.

Figure 5:
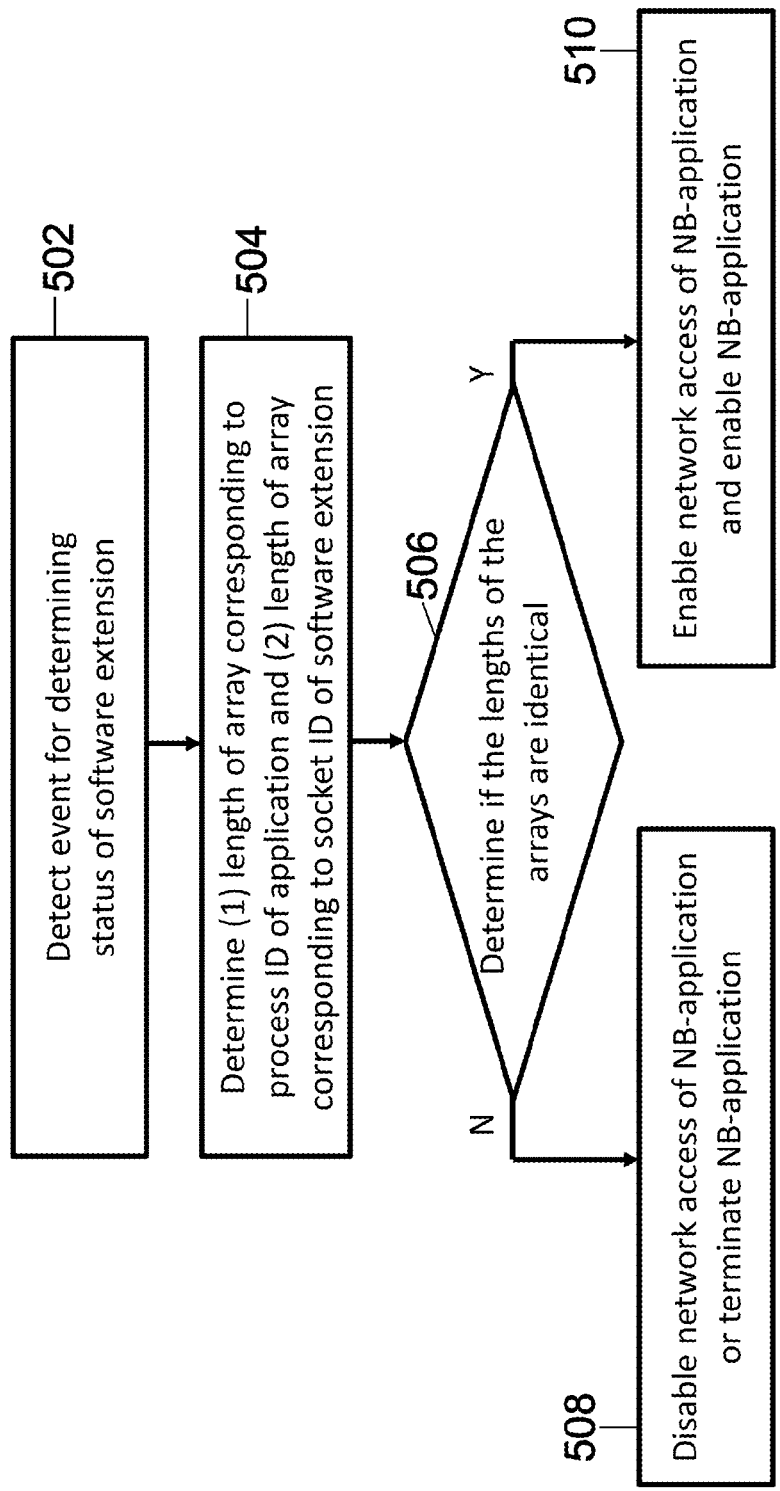
FIG. 5 illustrates a process of determining a status of a software extension by the status control module in accordance with some embodiments.

FIG. 5 illustrates a process of determining a status of a software extension by the status control module in accordance with some embodiments, as in step 410 of FIG. 4. The status control module 208 can be configured to determine the status of the software extension 204 in response to detecting external events. In step 502, the status control module 208 can detect an external event. The external events can include, for example, a receipt of a startup event message or a termination message from the software extension 204; and a receipt of a process start message or a process stop message from the network-based application 202. In other embodiments, the status control module 208 can be configured to determine the status of the software extension 204 periodically. For example, the server 104 can maintain a timer, and the server 104 can use the timer to check the status of the software extension 204 after every predetermined period. The predetermined period can be configured by an administrator of the server 104 or an administrator of the computing device 106. In some cases, the predetermined period can depend on an available computational bandwidth at the server 104.

In some embodiments, the status control module 208 can determine the status of the software extension 204 by comparing a length of columns (or arrays) in the status table 210 associated with the NB application 202. To this end, in step 504, the status control module 208 can be configured to determine a length of columns (or arrays) in the status table 210. The length of a first column can indicate a number of operating instances of an NB-application; the length of a second column can indicate a number of operating instances of a software extension. Therefore, when the second column of the status table has the same length as the first column, it indicates that the number of operating instances of the NB-application 202 and the number of operating instances of the software extension 204 are the same.

In step 506, the status control module 208 can be configured to determine if the lengths of the first column and the second column are identical. When the second column of the status table has the same length as the first column, as in the first and third status tables 302, 306 of FIG. 3, then the status control module 208 can determine that none of the software extensions associated with the NB-application is disabled and proceed to step 510. However, if the second column of the status table is shorter than the first column, as in the second status table 304 of FIG. 3, then the status control module 208 can determine that at least one of the software extension 204 is disabled and proceed to step 508.

In step 508, since at least one of the software extensions 204 is disabled, the status control module 208 can be configured to disable NB-application's network access or to terminate the NB-application 202, as discussed above with respect to FIGS. 2 and 4. In step 510, since all software extensions are properly enabled, the status control module 208 can be configured to enable NB-application's network access and enable the NB-application 202 to operate properly, as discussed above with respect to FIGS. 2 and 4.

In some embodiments, the server 104 can be configured to maintain a first counter to maintain a number of operating NB-application instances and a second counter to maintain a number of operating software extension instances. The status control module 208 can be configured to use the plurality of counters to determine the status of the software extension 204. For example, the status control module 208 can compare the values of the first counter and the second counter to determine whether the software extension 204 is enabled or disabled. The first counter can be updated based on the process start message and the process stop message received from the NB-application 202, as disclosed above with respect to FIG. 2; the second counter can be updated based on the start event message and the termination message received from the software extension 204, as disclosed above with respect to FIG. 2. In some embodiments, the first counter and the second counter can be a part of the status table 210.

In some embodiments, the status control module 208 can be configured to audit disabled software extensions. For example, once the status control module 208 determines that a software extension 204 associated with an NB-application 202 has been disabled, the status control module 208 can periodically check whether the software extension 204 has been re-enabled. This way, once the software extension 204 is re-enabled, the status control module 208 can cause the process module 206 to send a network stop message to the computing device 106.

In some embodiments, an NB-application 202 can be configured to run more than one software extension 204, and it may be desirable to determine that each of the software extensions 204 are properly enabled. To address this issue, the server 104 can be configured to maintain a multi-status table. FIG. 6 illustrates a multi-status table for tracking status of more than one software extensions in accordance with some embodiments. The multi-status table 602 can include N+1 columns (or N+1 arrays), the first column indicating a process ID of running instances of the NB-application 202, and the remaining N columns each indicating a socket identifier (socket ID) of running instances of distinct software extensions 204. For example, the multi-status table 602 has three arrays, the first array indicating a process ID of running instances of Internet Explorer, the second array indicating a socket ID of running instances of the parental control plugin, and the third array indicating a socket ID of running instances of the enterprise plugin.

The status control module 208 can be configured to update the multi-status table based on startup event messages received from the software extensions 204. The status control module 208 can be configured to receive an independent startup event message from each of the enabled software extensions 204. The startup event message can include an application identifier of the NB-application 202, a socket ID of the associated software extension 204, and a software extension identifier of the associated software extension 204. Subsequent to receiving a startup event message, the status control module 208 can determine, based on the application identifier in the startup event message, the NB-application 202 associated with the startup event message. This allows the status control module 208 to identify the status table for the startup event message amongst the plurality of status tables maintained by the server 104. Then, the status control module 208 can determine the software extension 204 associated with the startup event message based on the software extension identifier in the startup event message. This allows the status control module 208 to identify the column (or the array) for the startup event message amongst the columns in the identified status table. Subsequently, the status control module 208 can add the received socket ID to the identified column of the identified status table.

In the illustration of FIG. 6, the multi-status table 602 indicates that the parental control plugin associated with the Internet Explorer is properly enabled, but the enterprise plugin associated with the Internet Explorer is not properly enabled. Therefore, upon inspecting this multi-status table 602, the status control module 208 would either cause the network access of the Internet Explorer to be blocked or cause the Internet Explorer to be terminated.

In some embodiments, a single instance of a software extension 204 can be configured to serve all instances of an NB-application 204. For example, all tabs in a web browser can be configured to share a single instance of plugin. For such a configuration, the software extension status control system 200 can be configured to drop or ignore process start messages subsequent to the first process start message. For example, when the server 104 receives the first process start message from a first instance of an NB-application 202, the server 104 can update the status table to reflect that information. Then, when the server 104 receives the second process start message from a second instance of the NB-application 202, then the server 104 can ignore the second process start message so that the status control module 208 does not inadvertently indicate that the software extension is disabled.

Figure 7:
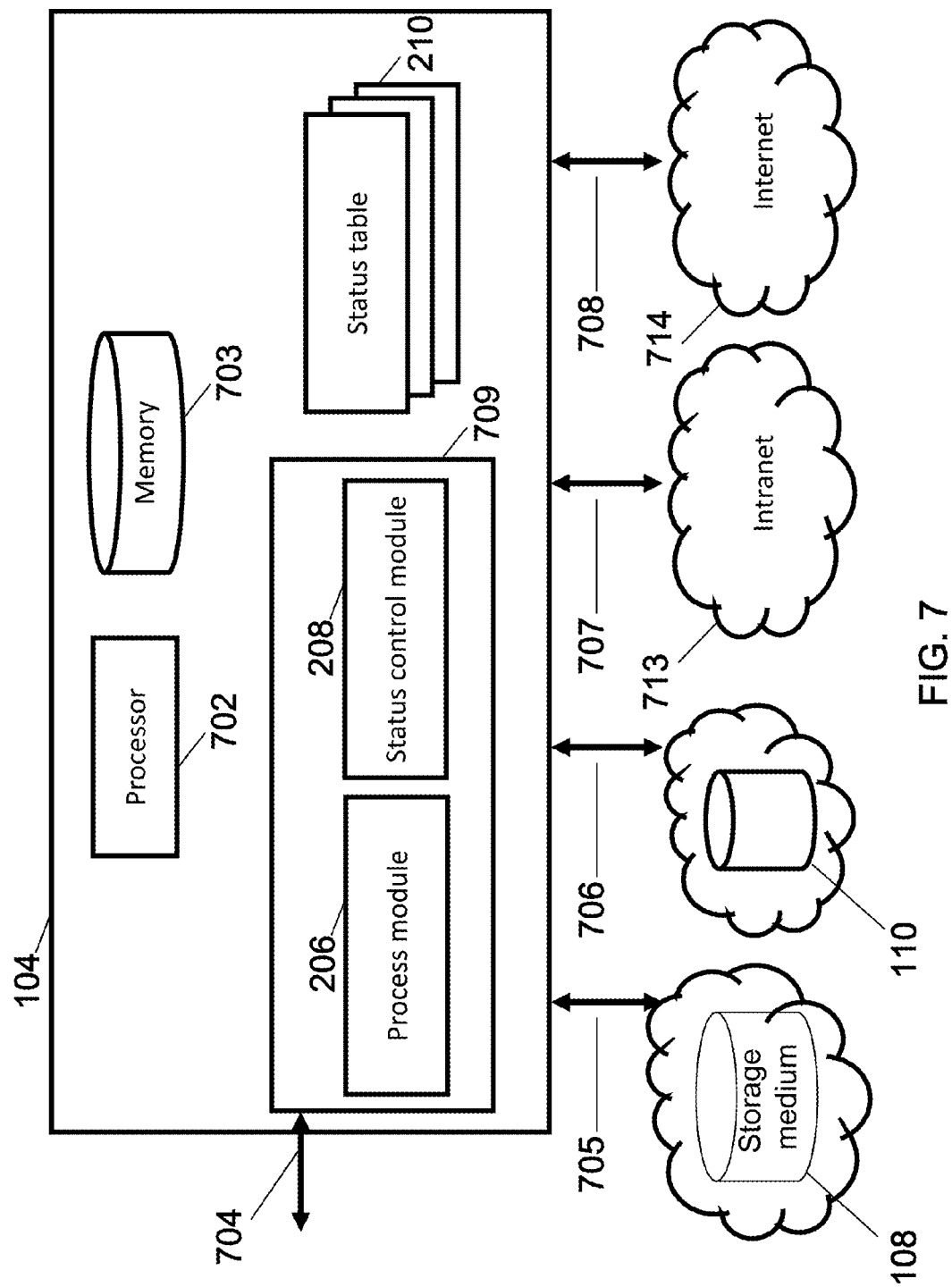
FIG. 7 is a block diagram of an exemplary server in accordance with some embodiments.

FIG. 7 is a block diagram of an exemplary server in accordance with some embodiments. The server 104 includes a processor 702, a memory 703, interfaces 704-708, a module 709 including a process module 206 and an status control module 208, and one or more status tables 210. The server 104 can communicate with other computing devices (not shown) via the interface 704; the server 104 can communicate with the local network storage 108 via the interface 705; the server 104 can communicate with the remote network storage 110 via the interface 706; the server 104 can communicate with the Intranet 713 via the interface 707; and the server 104 can communicate with the Internet 714 via the interface 708. The interfaces 704-708 are shown as separate interfaces but may be the same physical interface. The server 104 may include additional modules, less modules, or any other suitable combination of modules that perform any suitable operation or combination of operations.

The interfaces 704-708 provide an input and/or output mechanism for communication. In some cases, the interfaces 704-708 can be used to communicate within the computing system. For example, the processor 702 can use one of the interfaces 704-708 to communicate with memory 703. In other cases, the interface 704-708 can be used to communicate over a network. The interfaces 704-708 enable communication with other computing systems, such as computing devices 106 and servers 104, as well as other network nodes in the communication network 102. The interfaces 704-708 can be implemented in hardware to send and receive signals in a variety of mediums, such as optical, copper, and wireless, and in a number of different protocols some of which may be non-transient.

In some embodiments, the processor 702 can include one or more cores and can accommodate one or more threads to run various applications and modules, including the module 709 that includes the process module 206 and the status control module 208.

The process module 206 can be configured to communicate with an application instance running on another computing device over the interface 704. The process module 206 can receive a process start message and/or a process stop message from the application instance, and relay information in the process start message and/or the process stop message to the status control module 208. Also, the process module 206 can be configured to send a network start message and/or a network stop message to the computing device so that the process module 206 can cause the computing device to block or unblock network access of the application instance. In some embodiments, the process module 206 can operate in a proxy mode to forward messages between the computing device and the status control module 208.

The status control module 208 can be configured to determine a status of a software extension. If the status control module 208 determines that the software extension is disabled, the status control module can request the process module 206 to block the application's network access. The status control module 208 can be configured to determine the status of the software extension based on the one or more status tables 210. The status control module 208 can also be configured to update the information in the status table 210 based on information received from the process module 206, an application instance running on another computing device, and/or a software extension associated with an application instance running on another computing device.

In some embodiments, the module 709 can be implemented in software stored in the memory 703. The memory 703 can be a non-transitory computer readable medium, flash memory, a magnetic disk drive, an optical drive, a programmable read-only memory (PROM), a read-only memory (ROM), or any other memory or combination of memories. The software can run on a processor 702 capable of executing computer instructions or computer code. The processor 702 might also be implemented in hardware using an application specific integrated circuit (ASIC), programmable logic array (PLA), field programmable gate array (FPGA), or any other integrated circuit.

The server 104 can operate using an operating system (OS) software. In some embodiments, the OS software is based on a Linux software kernel and runs specific applications in the server 104 such as monitoring tasks and providing protocol stacks. The OS software allows resources to be allocated separately for control and data paths. For example, certain packet accelerator cards and packet services cards are dedicated to performing routing or security control functions, while other packet accelerator cards/packet services cards are dedicated to processing user session traffic. As network requirements change, hardware resources can be dynamically deployed to meet the requirements in some embodiments.

The system's software can be divided into a series of tasks that perform specific functions. These tasks communicate with each other as needed to share control and data information throughout the server 104. A task can be a software process that performs a specific function related to system control or session processing. Three types of tasks operate within the server 104 in some embodiments: critical tasks, controller tasks, and manager tasks. The critical tasks control functions that relate to the computing system's ability to process calls such as initialization, error detection, and recovery tasks. The controller tasks can mask the distributed nature of the software from the user and perform tasks such as monitoring the state of subordinate manager(s), providing for intra-manager communication within the same subsystem, and enabling inter-subsystem communication by communicating with controller(s) belonging to other subsystems. The manager tasks can control system resources and maintain logical mappings between system resources.

Individual tasks that run on processors in the application cards can be divided into subsystems. A subsystem is a software element that either performs a specific task or is a culmination of multiple other tasks. A single subsystem includes critical tasks, controller tasks, and manager tasks. Some of the subsystems that run on the server 104 include a system initiation task subsystem, a high availability task subsystem, a shared configuration task subsystem, and a resource management subsystem.

The system initiation task subsystem can be responsible for starting a set of initial tasks at system startup and providing individual tasks as needed. The high availability task subsystem can work in conjunction with the recovery control task subsystem to maintain the operational state of the server 104 by monitoring the various software and hardware components of the server 104. Recovery control task subsystem can be responsible for executing a recovery action for failures that occur in the server 104 and receives recovery actions from the high availability task subsystem. Processing tasks can be distributed into multiple instances running in parallel so if an unrecoverable software fault occurs, the entire processing capabilities for that task are not lost. User session processes can be sub-grouped into collections of sessions so that if a problem is encountered in one sub-group users in another sub-group will not be affected by that problem.

Shared configuration task subsystem can provide the server 104 with an ability to set, retrieve, and receive notification of configuration parameter changes and is responsible for storing configuration data for the applications running within the server 104. A resource management subsystem can be responsible for assigning resources (e.g., processor and memory capabilities) to tasks and for monitoring the task's use of the resources.

In some embodiments, the server 104 can reside in a data center and form a node in a cloud computing infrastructure. The server 104 can also provide services on demand. A module hosting a client is capable of migrating from one computing system to another system seamlessly, without causing program faults or system breakdown. The server 104 on the cloud can be managed using a management system.

The computing device 106 can include user equipment. The user equipment communicates with one or more radio access networks and with wired communication networks. The user equipment can be a cellular phone having phonetic communication capabilities. The user equipment can also be a smart phone providing services such as word processing, web browsing, gaming, e-book capabilities, an operating system, and a full keyboard. The user equipment can also be a tablet computer providing network access and most of the services provided by a smart phone. The user equipment operates using an operating system such as Symbian OS, iPhone OS, RIM's Blackberry, Windows Mobile, Linux, HP WebOS, and Android. The screen might be a touch screen that is used to input data to the mobile device, in which case the screen can be used instead of the full keyboard. The user equipment can also keep global positioning coordinates, profile information, or other location information.

The computing device 106 can also include any platforms capable of computations and communication. Non-limiting examples can include televisions (TVs), video projectors, set-top boxes or set-top units, digital video recorders (DVR), computers, netbooks, laptops, and any other audio/visual equipment with computation capabilities. The computing device 106 is configured with one or more processors that process instructions and run software that may be stored in memory. The processor also communicates with the memory and interfaces to communicate with other devices. The processor can be any applicable processor such as a system-on-a-chip that combines a CPU, an application processor, and flash memory. The computing device 106 can also provide a variety of user interfaces such as a keyboard, a touch screen, a trackball, a touch pad, and/or a mouse. The computing device 106 may also include speakers and a display device in some embodiments.

Throughout the disclosure, the term "application instance" is generally used to refer to an instance of an application or software to which a process identifier is assigned by an operating system. In some cases, a computer system can have multiple instances of the same application. For example, OS X can run multiple instances of Safari web browsers. In some embodiments, the application instance can include one or more processes that collaborate to run an application instance. Other embodiments of an "application instance" are within the scope of the disclosed subject matter.

Although the disclosed subject matter has been described and illustrated in the foregoing exemplary embodiments, it is understood that the present disclosure has been made only by way of example, and that numerous changes in the details of implementation may be made without departing from the spirit and scope, which is limited only by the claims which follow.

A "server," "client," "agent," "module," "interface," and "host" is not software per se and includes at least some tangible, non-transitory hardware that is configured to execute computer readable instructions. In addition, the phrase "based on" does not imply exclusiveness—for example, if X is based on A, X can also be based on B, C, and/or D.

What is claimed is:

1. An apparatus comprising:
one or more interfaces configured to provide communication with a computing device via a communication network;
non-transitory memory configured to maintain computer readable instructions and a status table, wherein the status table includes information indicative of a status of a software extension associated with a network-based application instantiated on the computing device;
a processor in communication with the memory, wherein the computer readable instructions are configured to cause the processor to:
determine, based on the information in the status table, the status of the software extension associated with the network-based application, wherein the status of the software extension is indicative of whether the software extension is enabled or disabled; and
when the software extension is disabled, send a network stop message to the computing device to cause a network access of the network-based application to be disabled.

2. The apparatus of claim 1, wherein the status table includes a first array and a second array, wherein the first array includes at least one process identifier of instances of the network-based application, and the second array includes at least one socket identifier of instances of the software extension, wherein each socket identifier identifies a communication connection between an instance of the software extension and the server.

3. The apparatus of claim 2, wherein the computer readable instructions are configured to cause the processor to compare lengths of the first array and the second array, and if the length of the first array is different from the length of the second array, the computer readable instructions are configured to cause the processor to determine that the software extension is disabled.

4. The apparatus of claim 2, wherein the computer readable instructions are configured to cause the processor to:
receive a process start message from a first instance of the network-based application, wherein the process start message includes a first process identifier of the first instance of the network-based application;
store the first process identifier in the first array of the status table;
receive a startup event message from a first instance of the software extension, wherein the startup event message includes a first socket identifier of the first instance of the software extension; and
store the first socket identifier in the second array of the status table.

5. The apparatus of claim 4, wherein the memory includes a plurality of status tables, wherein the process start message includes an application identifier of the network-based application, and wherein the computer readable instructions are configured to cause the processor to identify the status table for the process start message based on the application identifier.

6. The apparatus of claim 1, wherein the network stop message includes a process identifier of an instance of the network-based application whose network access is to be disabled.

7. The apparatus of claim 6, wherein the computer readable instructions are configured to cause the processor to retrieve, from the status table, the process identifier of the instance of the network-based application whose network access is to be disabled.

8. The apparatus of claim 1, wherein the computer readable instructions are configured to cause the processor to determine the status of the software extension in response to an external event, wherein the external event includes one of: a receipt of a startup event message from the software extension; a receipt of a termination message from the software extension; a receipt of a process start message from the network-based application; and a receipt of a process stop message from the network-based application.

9. The apparatus of claim 1, wherein the computer readable instructions are configured to cause the processor to cause a message to be sent to a user of the computing device that the software extension is disabled.

10. A method comprising:
establishing a communication channel between a server and a computing device over a communication network;
maintaining, at the server, a status table that includes information indicative of a status of a software extension associated with a network-based application instantiated on the computing device;
determining, at the server, based on the information in the status table, the status of the software extension associated with the network-based application, wherein the status of the software extension is indicative of whether the software extension is enabled or disabled; and
if the software extension is disabled, sending, by the server, a network stop message to the computing device to cause a network access of the network-based application to be disabled.

11. The method of claim 10, wherein the status table includes a first array and a second array, wherein the first array includes at least one process identifier of instances of the network-based application, and the second array includes at least one socket identifier of instances of the software extension, wherein each socket identifier identifies a communication connection between an instance of the software extension and the server.

12. The method of claim 11, wherein determining the status of the software extension comprises comparing lengths of the first array and the second array, and if the length of the first array is different from the length of the second array, determining that the software extension is disabled.

13. The method of claim 11, further comprising:
receiving, at the server, a process start message from a first instance of the network-based application, wherein the process start message includes a first process identifier of the first instance of the network-based application;
storing, by the server, the first process identifier in the first array of the status table;
receiving, at the server, a startup event message from a first instance of the software extension, wherein the startup event message includes a first socket identifier of the first instance of the software extension; and
storing, by the server, the first socket identifier in the second array of the status table.

14. The method of claim 10, wherein the process start message includes an application identifier of the network-based application, and wherein the method comprises maintaining, by the server, a plurality of status tables, and identifying, by the server, the status table for the process start message based on the application identifier.

15. The method of claim 10, wherein determining the status of the software extension comprises determining the status of the software extension in response to an external event, wherein the external event includes one of: a receipt of a startup event message from the software extension; a receipt of a termination message from the software extension; a receipt of a process start message from the network-based application; and a receipt of a process stop message from the network-based application.

16. The method of claim 10, further comprising causing, by the server, a message to be sent to a user of the computing device that the software extension is disabled.

17. A non-transitory computer readable medium having executable instructions operable to cause a server to:
   establish a communication channel between the server and a computing device over a communication network;
   maintain a status table that includes information indicative of a status of a software extension associated with a network-based application instantiated on the computing device;
   determine based on the information in the status table, the status of the software extension associated with the instance of the network-based application, wherein the status of the software extension is indicative of whether the software extension is enabled or disabled; and
   if the software extension is disabled, send a network stop message to the computing device to cause a network access of the instance of the network-based application to be disabled.

18. The computer readable medium of claim 17, wherein the status table includes a first array and a second array, wherein the first array includes at least one process identifier of instances of the network-based application, and the second array includes at least one socket identifier of instances of the software extension, wherein each socket identifier identifies a communication connection between an instance of the software extension and the server.

19. The computer readable medium of claim 18, further comprising executable instructions operable to cause the server to:
   compare lengths of the first array and the second array, and
   if the length of the first array is different from the length of the second array,
   determine that the software extension is disabled.

20. The computer readable medium of claim 17, wherein the process start message includes an application identifier of the network-based application, and wherein the computer readable medium further comprises executable instructions operable to cause the server to maintain a plurality of status tables, and identify the status table for the process start message based on the application identifier.

\* \* \* \* \*